(12) United States Patent
Barnes

(10) Patent No.: US 6,721,193 B2
(45) Date of Patent: Apr. 13, 2004

(54) CACHE MEMORY

(75) Inventor: William Bryan Barnes, Bristol (GB)

(73) Assignee: STMicroelectronics Limited, Bristol (GB)

( * ) Notice: Subject to any disclaimer, the term of this patent is extended or adjusted under 35 U.S.C. 154(b) by 0 days.

(21) Appl. No.: 10/130,175

(22) PCT Filed: Sep. 11, 2001

(86) PCT No.: PCT/GB01/04070

§ 371 (c)(1),
(2), (4) Date: May 13, 2002

(87) PCT Pub. No.: WO02/23346

PCT Pub. Date: Mar. 21, 2002

(65) Prior Publication Data

US 2002/0181265 A1 Dec. 5, 2002

(30) Foreign Application Priority Data

| Sep. 12, 2000 | (GB) | 0022323 |
| Sep. 12, 2000 | (GB) | 0022324 |
| Sep. 12, 2000 | (GB) | 0022325 |

(51) Int. Cl.[7] ............................................. G11C 15/00
(52) U.S. Cl. ........................................ 365/49; 365/154
(58) Field of Search ................... 365/49, 154, 189.04, 365/189.08, 194, 203, 230.08

(56) References Cited

U.S. PATENT DOCUMENTS

| 4,907,189 | A |   | 3/1990  | Branson et al. ............. 364/900 |
| 5,226,009 | A | * | 7/1993  | Arimoto ................. 365/189.04 |
| 5,353,424 | A |   | 10/1994 | Partovi et al. ............. 395/425 |
| 5,471,415 | A | * | 11/1995 | McClure ..................... 365/49 |
| 5,528,541 | A |   | 6/1996  | Ghia et al. .................. 365/203 |
| 5,550,774 | A |   | 8/1996  | Brauer et al. ........... 365/189.02 |
| 5,598,551 | A | * | 1/1997  | Barajas et al. .............. 711/157 |
| 5,995,420 | A |   | 11/1999 | Hesley ................... 365/189.07 |
| 6,345,336 | B1 | * | 2/2002 | Takahashi ................... 711/125 |

* cited by examiner

Primary Examiner—Anh Phung
(74) Attorney, Agent, or Firm—Lisa K. Jorgenson; Robert Iannucci; Seed IP Law Group PLLC

(57) ABSTRACT

A cache memory and method for operating a cache memory are provided which comprise a tag RAM, tag RAM sense amplifier circuitry, data RAM sense amplifier circuitry and decision circuitry. Timing difficulties exist in determining whether or not a hit has occurred and in outputting the data from the data RAM upon occurrence of a hit. Upon addressing a tag entry and the corresponding data entry, the tag information is output from the tag RAM and is compared with input address information. A decision is reached as to whether or not identity exists. Only when the result of that decision has been validly determined can data be output.

50 Claims, 4 Drawing Sheets

CACHE MEMORY

BACKGROUND OF THE INVENTION

1. Field of the Invention

The present invention relates to the general field of cache memory circuits.

2. Description of the Related Art

Cache memory circuits are well known in the art as memory circuitry which may enable optimal response to the needs of a high speed processor. Cache memories are usable as temporary storage of information, for example of information relatively recently used by the processor. Information in cache RAM may be stored based upon two principles, namely spatial locality and temporal locality. The principle of spatial locality is based upon the fact that when data is accessed at an address, there is an above average likelihood that the data which is next required will have an address close to that of the data which has just been accessed. By contrast, temporal locality is based upon the fact that there is an above average probability that data which has just been accessed will be accessed again shortly.

In one approach therefore, when an item of data is accessed, adjacent data is written to cache memory in anticipation of the need to access it, and in another, the item which is accessed is stored. A desirable approach is to do both.

There are many different cache configurations, ranging from direct-mapped cache memory to fully-associative cache memory.

Although the present invention is described in the context of a set-associative cache memory, is not envisaged that it be so limited, and the architecture described and the particular circuit details are equally applicable to other types of cache.

In a typical cache memory, there is provided a so-called "tag memory" and a so-called "data memory". Each entry in the tag memory has an associated entry in the data memory. The tag memory typically stores the most significant bits of an address at a position in the memory determined by the least significant bits of the address so that application of the least significant bits of the address to an address decoder causes the tag memory to output the stored most significant bits of an address. Comparison is then made between the output of the tag memory, namely the most significant bits of the stored address and the most significant bits of the address being sought. When identity occurs between the output of the tag memory and the address being sought, then there is said to be a hit in the tag memory. A line or entry in the data memory is associated with the access from the address decoder and a second output is made which consists of the data stored at an address. If there is a hit between the address applied to the cache and the tag information stored, then the contents of the data memory are output from the cache. If there is no hit, (this situation is termed a "miss") then the contents of the data memory are not output.

According to the particular technique being used, a mechanism may exist for overwriting both the tag and data RAMs if no hit occurs.

It will be clear to those skilled in the art that timing difficulties exist in determining whether or not a hit has occurred, and in outputting the data from the data RAM upon the occurrence of a hit. For example, upon addressing a tag entry and the corresponding data entry, the tag information is output from the tag RAM and must then be compared with input address information and a decision reached as to whether or not identity exists. Only when the result of that decision has been validly determined can a gate be controlled to enable output of the data from the data RAM. The critical path is thus the tag RAM access.

A person skilled in the art will also be aware that memory sense amplifiers respond to differentials on bit lines or to potentials on bit lines to provide an output which corresponds to the information stored in the memory cells via bit lines, experience a delay after access to the memory cells of concern before those inputs have a sufficient potential difference to accurately sense the contents of the cell. This is due to the inherent capacitance and inductance of the bit lines. As a result, the sense amplifiers must be clocked at an instant which is sufficiently later than the memory cell access to ensure that the sense amplifier inputs are valid, and hence that the output of the sense amplifier will be valid. There is a further timing issue in that only at some interval after clocking of the sense amplifier-this interval being due to the inherent delay of the sense amplifier-the sense amplifier outputs will correspond to the memory cell contents. The outputs of the sense amplifier in a tag RAM typically form first inputs to a comparator, the comparator having second inputs formed by the most significant bits of the address concerned and further having an output fed to the above-mentioned gate. It will be appreciated by those skilled in the art that the comparator output should only indicate a hit when a tag hit is genuinely present or a miss when a tag miss is present. It is undesirable that the comparator output indicate a hit or miss merely because its inputs are not yet valid, because for example the sense amplifier providing those inputs has not yet settled or has not yet been enabled by the clock.

BRIEF SUMMARY OF THE INVENTION

According to a first aspect of the invention there is provided a cache memory having a tag RAM, tag RAM sense amplifier circuitry, a data RAM, data RAM sense amplifier circuitry and decision circuitry for selectively enabling said data RAM sense amplifier circuitry, said decision circuitry having a first input for stored tag data and a second input for address data, said decision circuitry having a first valid state when said tag data matches said address data and a second valid state different to said first valid state when said tag data differs from said address data, said decision circuitry having a control input for setting said decision circuitry to an invalid state different to said valid states, wherein said decision circuitry has first and second nodes, said nodes being at complementary logic levels in said valid output states and at a common potential in said invalid state.

Preferably said tag RAM sense amplifier circuitry has an enable input for receiving an enable signal, said cache memory further comprising timing circuitry having an input connected to said enable input and a first output connected to said control input of said decision circuitry, whereby said decision circuit attains one of said first and second valid states a first predetermined interval after application of an enable signal to said enable input of said tag RAM sense amplifier circuitry.

Advantageously said decision circuitry further comprises first current source circuitry for selectively applying a current to said first node when said address data differs from said stored tag data and second current source circuitry for applying a second current source to said second node and sensing circuitry having first and second sensing circuitry nodes, said sensing circuitry being responsive to a potential on said first and second nodes for establishing said first and second valid states on said first and second sensing circuitry nodes.

Conveniently said sensing circuitry comprises equalization circuitry responsive to said enable input of said tag RAM sense amplifier circuitry for selectively applying said common potential to said first and second sensing circuitry nodes.

Preferably, said sensing circuitry comprises a latch circuit connected between said first and second sensing circuitry nodes and selectively connectable to said first and second nodes via a gating circuit, said latch circuit and said gating circuit being activated by said control input.

Preferably again, said second current source circuitry is connected to a second output of said timing circuit, whereby said second current source is activated a second predetermined interval after said application of said enable signal. Conveniently, said first current source circuitry comprises a first transistor.

Advantageously, said tag RAM comprises a plurality of bit line pairs, each pair having an associated tag RAM sense amplifier and an associated first current source, each first current source comprising a respective first transistor, said first transistors being identical and of one polarity, said first current sources being connected between one said first node and a reference node, and said second current source circuitry comprising a said plurality of second transistors connected between said second node and said reference node, said second transistors being of said one polarity.

Conveniently, one of said second transistors has half the current carrying capability of said first transistors, and has a control gate connected to said second output of said timing circuitry.

Conveniently, the remaining second transistors have control gates connected to said reference node.

Advantageously, said timing circuitry comprises a first delay circuit having said enable input of said tag RAM sense amplifier circuitry as its input and said second output as its output and a second delay circuitry in series therewith, said second delay circuit comprising a plurality of third transistors connected in parallel between a timing node and said reference node, said third transistors being of said one polarity, and a fourth transistor of opposite polarity connected between said timing node and a supply rail, said timing node providing an output to said control input.

Advantageously again, said decision circuitry further comprises logic circuitry connected to said data RAM sense amplifier at an enable terminal thereof, said logic circuitry being responsive to said first and second sensing circuitry nodes and providing a first predetermined output for enabling said data RAM sense amplifier circuitry only in response to one of said valid states at said nodes.

Conveniently, said logic circuitry has a control input whereby said logic circuitry responds to a predetermined logic state at said control input to provide said predetermined output for enabling said data RAM sense amplifier circuitry in response to the other valid state.

Preferably said data RAM sense amplifier circuitry has differential input terminals and precharge and equalization circuitry for precharge and equalization of said differential input terminals, said cache memory further comprising OR circuitry connected to said first and second sensing circuitry nodes, and to said precharge and equalization circuitry for terminating precharge and equalization when said first and second sensing circuitry nodes change from said invalid state to one of said valid states.

Advantageously, said data RAM sense amplifier circuitry has an output for data stored by said data RAM, said output being at a high impedance state when said precharge and equalization circuitry is active.

Preferably, said tag RAM sense amplifier circuitry has first and second differential outputs, wherein said decision circuitry further comprises multiplexer circuitry having an output, said multiplexer circuitry having an input for said address data whereby said multiplexer circuitry passes the state at said first differential output when said address data is logic 1 and the state at said second differential output when said address data is logic 0.

Conveniently, said first current source circuitry responds to the output of said multiplexer circuitry.

According to a second aspect of the invention there is provided a method of operating a cache memory having a stored tag data, an input for address data, a data RAM, data RAM sense amplifier circuitry and decision circuitry for selectively enabling said data RAM sense amplifier circuitry, said decision circuitry having a first and a second node, the method comprising: sensing stored tag data; comparing said stored tag data with input address data; and setting said first and second nodes to a common potential, wherein said comparing step comprises providing a first logic level on the first node and a second opposite logic level on the second node in response to a match between said stored tag data and said input address data; and providing said second logic level on the first node and said second opposite logic level on the first node when said stored tag data differs from said address data.

Advantageously said step of sensing comprises providing an enable signal to said tag RAM sense amplifier circuitry and maintaining said common potential on said first and second nodes for a first predetermined interval after application of said enable signal.

Conveniently, said decision circuitry further has a sense node and a reference node, and said comparing step comprising: applying a reference current to said reference node, applying a current to said sense node when said input address data differs from said stored tag data after a second interval, applying the potentials on said reference and sense nodes to a latch circuit.

Preferably, said cache memory comprises a tag RAM and a tag RAM sense amplifier, having first and second differential outputs, wherein said comparing step further comprises selecting one of said differential outputs when said address data has a first logic value, and the other of said differential outputs when said address data has a second logic value opposite to said first logic value, and using the selected output to control application of said current to said sense node.

According to a third aspect of the present invention there is provided a cache memory having a tag RAM, tag RAM sense amplifier circuitry, a data RAM, data RAM sense amplifier circuitry and decision circuitry for providing a read enable signal to a read enable terminal of said data RAM sense amplifier circuitry, said decision circuitry having a first input for stored tag data, a second input for address data and a pair of intermediate nodes, a first of said intermediate nodes being at logic 1 and the second being at logic 0 when said tag data matches said address data, the second of said intermediate nodes being at logic 1 and the first being at logic 0 when said tag data differs from said address data, said decision circuitry having a control input for setting said nodes to a common potential, wherein said decision circuitry further comprises logic circuitry being responsive to said first and second intermediate nodes and operable to provide a read enable signal to said read enable terminal only in response to a said match, wherein said logic circuitry has a control input and said logic circuitry responds to a predetermined logic state at said control input to provide said read enable signal to said read enable terminal whenever said intermediate nodes have complementary levels.

According to a fourth aspect of the present invention there is provided a method of operating a cache memory having a tag RAM, tag RAM sense amplifier circuitry, a data RAM, data RAM sense amplifier circuitry having a read enable input, the method comprising: sensing stored tag data; comparing said sensed tag data with input address data; establishing a first circuit condition and maintaining said first circuit condition until a valid comparison is achieved and upon achieving a valid comparison: establishing a second circuit condition when a match is detected between said sensed tag data and said input address data establishing a third circuit condition when no match is detected, in response to said step of establishing said second condition: generating a read enable signal; and supplying said read enable signal to said read enable input, the method further comprising: determining an input at a control terminal to selectively provide said read enable signal to said read enable terminal responsive to said step of establishing said third condition.

According to a fifth aspect of the present invention there is provided a cache memory having a tag RAM, tag RAM sense amplifier circuitry, a data RAM, data RAM sense amplifier circuitry and decision circuitry, the tag RAM sense amplifier circuitry having an enable input for receiving a sense amplifier enable signal, the decision circuitry having a first input for stored tag data, a second input for address data and a control input for enabling said decision circuitry, the data RAM sense amplifier circuitry having a disable input terminal and a read input terminal, said decision circuitry providing a data read signal to said read input terminal of said data RAM sense amplifier circuitry when a match exists between said stored tag data and said address data, the memory further comprising: timing circuitry responsive to said sense amplifier enable signal for maintaining a first level at said control input thereby holding an output of said decision circuitry in an inactive condition for a given period, and thereafter applying a second level at said control input, thereby allowing said output to become active; and logic circuitry sensing an active output of said decision circuitry for supplying a disabling signal to said disable input terminal, thereby disabling said data RAM sense amplifier circuitry until after said output of said decision circuitry becomes active.

According to a sixth aspect of the present invention there is provided a method of operating a cache memory having a tag RAM, tag RAM sense amplifier circuitry, a data RAM, data RAM sense amplifier circuitry and decision circuitry, the tag RAM sense amplifier circuitry having an enable input for receiving a sense amplifier enable signal, the decision circuitry having a first input for stored tag data, a second input for address data and a control input for enabling said decision circuitry, the data RAM sense amplifier circuitry having a disable input terminal and a read input terminal, the method comprising: providing a disabling signal to said disable input terminal, thereby disabling said data RAM sense amplifier circuitry; maintaining a first level at said control input thereby holding an output of said decision circuitry in an inactive condition for a given period after said sense amplifier enable signal; thereafter applying a second level at said control input, thereby allowing said output to become active; sensing the output of said decision circuitry; in response to an active output, terminating supply of said disabling signal to said disable input terminal; and providing a data read signal to said read input terminal of said data RAM sense amplifier circuitry when a match exists between said stored tag data and said address data.

BRIEF DESCRIPTION OF THE SEVERAL VIEWS OF THE DRAWINGS

An embodiment of the invention will now be described with reference to the accompanying drawings in which.

DETAILED DESCRIPTION OF THE INVENTION

Figure 1:
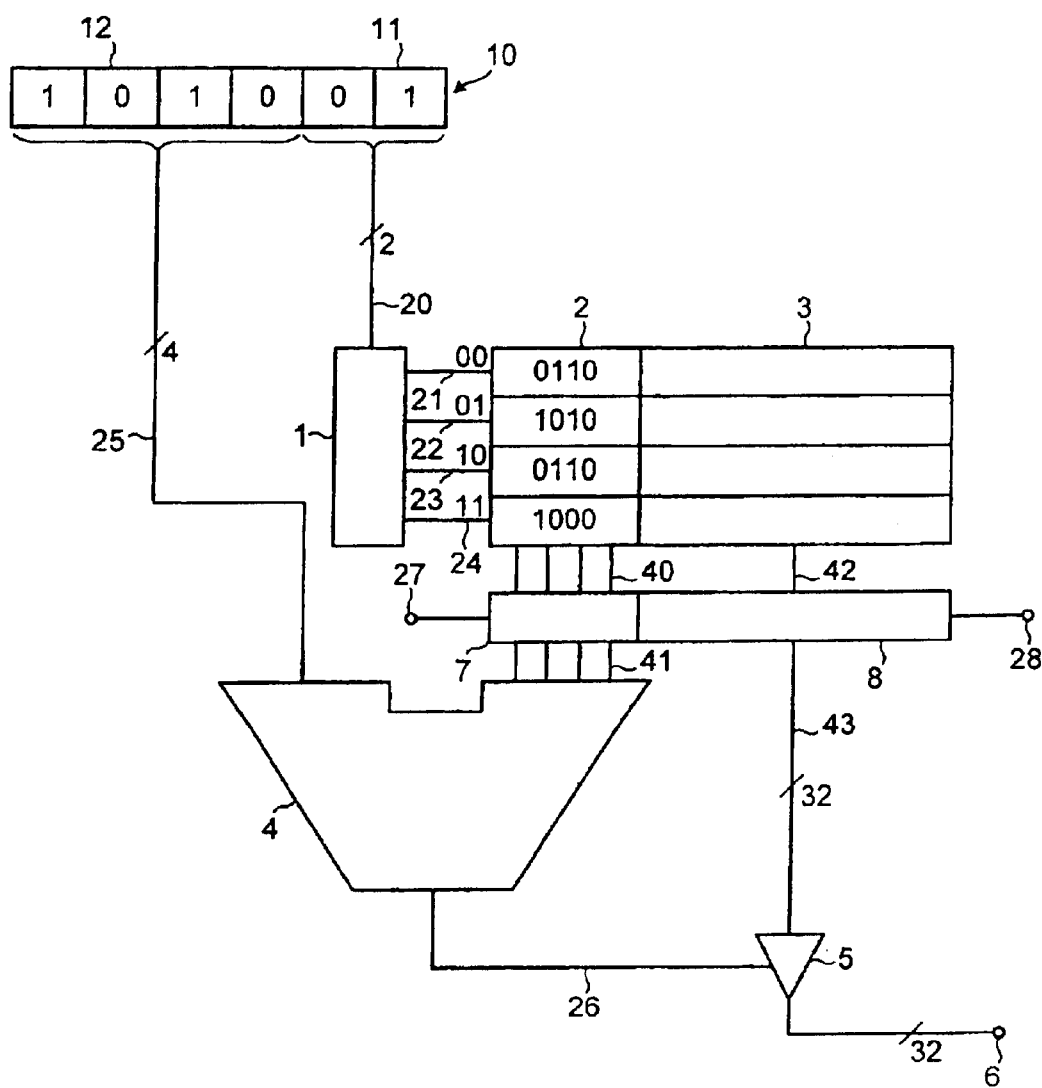
FIG. 1 shows a block schematic diagram of a cache memory device of the prior art.

Referring first to FIG. 1, a cache memory device has an address decoder 1 having an input 20 and four outputs 21–24 addressing the four rows of a tag RAM 2, having respective addresses "00", "01", "10" and "11" the outputs of the decoder simultaneously addressing the four rows of a data RAM 3. The tag RAM 2 has four column lines 40 which are input to a first sense amplifier block 7, the sense amplifier block 7 having four outputs 41 providing first inputs to a comparator 4. A second input to the comparator 4 is provided by a four way bus 25. The data RAM 3 has 32 column lines 42 fed to a second sense amplifier block 8 which has 32 output lines 33, the 32 output lines being fed to a gating circuit 5 controlled by the output 26 of the comparator 4. The first sense amplifier block 7 has a clock input 27 and the second amplifier block 8 has a clock input 28.

Reference numeral 10 indicates a six bit address which consists of two least significant bits 11 which provide the input 20 to the address decoder 1 and four most significant bits 12 which provide the second input 25 to the comparator 4.

In this simplified example, the least significant bits 11 are "01" and the most significant bits 12 are "1010".

In use the least significant bits 11 are supplied over input line 20 to the address decoder 1 and the address decoder provides an output on line 22, the second line of the cache which has an address "01". Further inspection of FIG. 1 shows the contents of the second line of the tag RAM is "1010" which in this example corresponds to the most significant bits 12 of the address 10.

As known to those skilled in the art, the memory cells of the second line of the tag RAM are connected by the output of the address decoder to the bit lines 40 and after a delay caused by propagation along the bit lines the inputs to the first sense amplifier block 7 are in the state "1010". At a predetermined time the clock input 27 to the first sense amplifier block 7 changes state and shortly thereafter the sense amplifiers of the first sense amplifier block 7 assume the output state "1010". This state change will typically be latched at the output of each of the sense amplifiers.

The input "1010" is applied to the first input of the comparator 4 and the most significant bits 12 (also "1010") are applied to the second input of the comparator 4. After a period corresponding to the propagation delay of the comparator 4, the output line 26 will go to a logic 1 state.

Activation of the word line 22 to the second row of the tag RAM also activates the second row of the data RAM 3. In a similar fashion to the tag RAM, this causes the bit lines 42 to acquire a state corresponding to the data stored in the second row of the data RAM 3, this state being applied to the second sense amplifier block 8 and, upon a clock transition being applied to the corresponding clock terminal 28, the output lines 43 to the gating circuit 5 correspond to the contents of the second row of the data RAM.

At the time the comparator output line 26 goes to logic 1 the gating circuit 5 passes the logic state at its input to the output bus 6.

From the above discussion it will be seen that if the two sense amplifier blocks were clocked at the same time to provide a valid output at the same time there will be an additional delay after the clock before the gate 5 can provide an output caused by the propagation delay of the comparator 4 in the "hit/miss" path.

Figure 2:
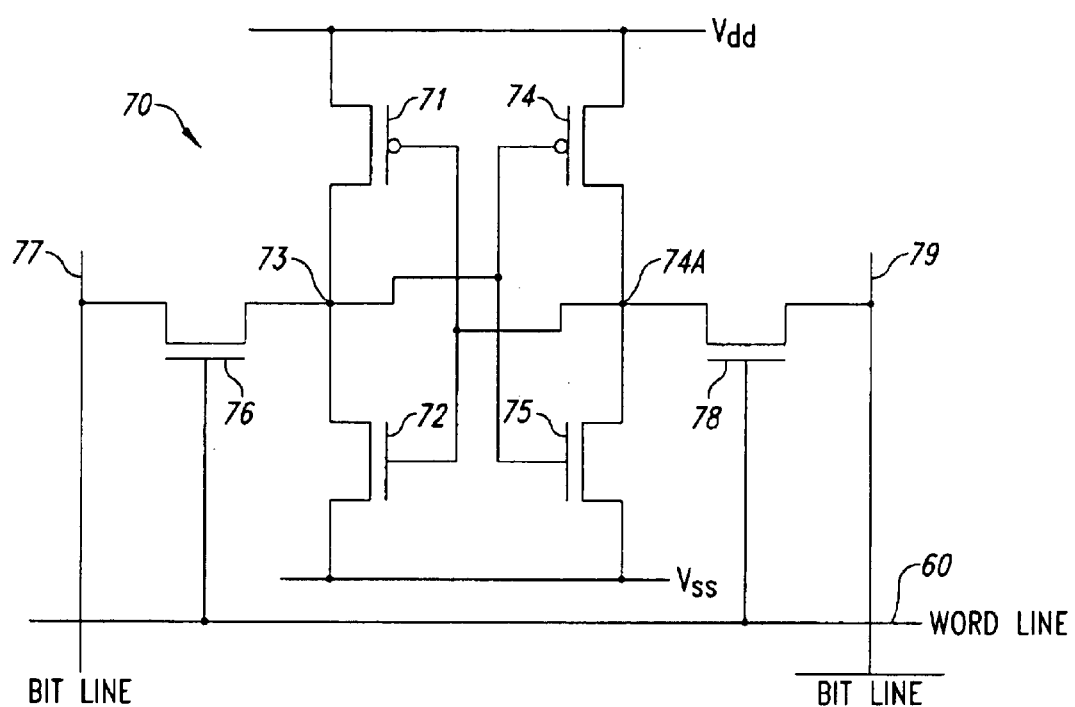
FIG. 2 shows an exemplary schematic diagram of a memory cell.

Referring now to FIG. 2, an exemplary memory cell 70 will now be described. It will be understood by those skilled in the art that many other configurations of memory cell may be used. The memory cell 70 comprises two cross-coupled CMOS inverters connected between a positive supply $V_{dd}$ and a negative supply $V_{ss}$. The first CMOS inverter consists of a p MOSFET 71 having its main current path connected in series with an n MOSFET 72, the common connection between the two transistors forming a first node 73. The second CMOS inverter likewise consists of a p MOSFET 74 having its main current path connected in series with an n MOSFET 75, the common connection between the two transistors forming a second node 74A. The first node 73 is connected to the gates of the two transistors of the second inverter and the second node 74A is connected to the gates of the two transistors of the first inverter. The first node 73 is connected via a first N-type path transistor 76 to a first bit line 77 and the second node 74A is connected via a second N-type path transistor 78 to a second bit line 79. The gates of the N-type path transistors 76 and 78 are connected to a word line 60.

Figure 3:
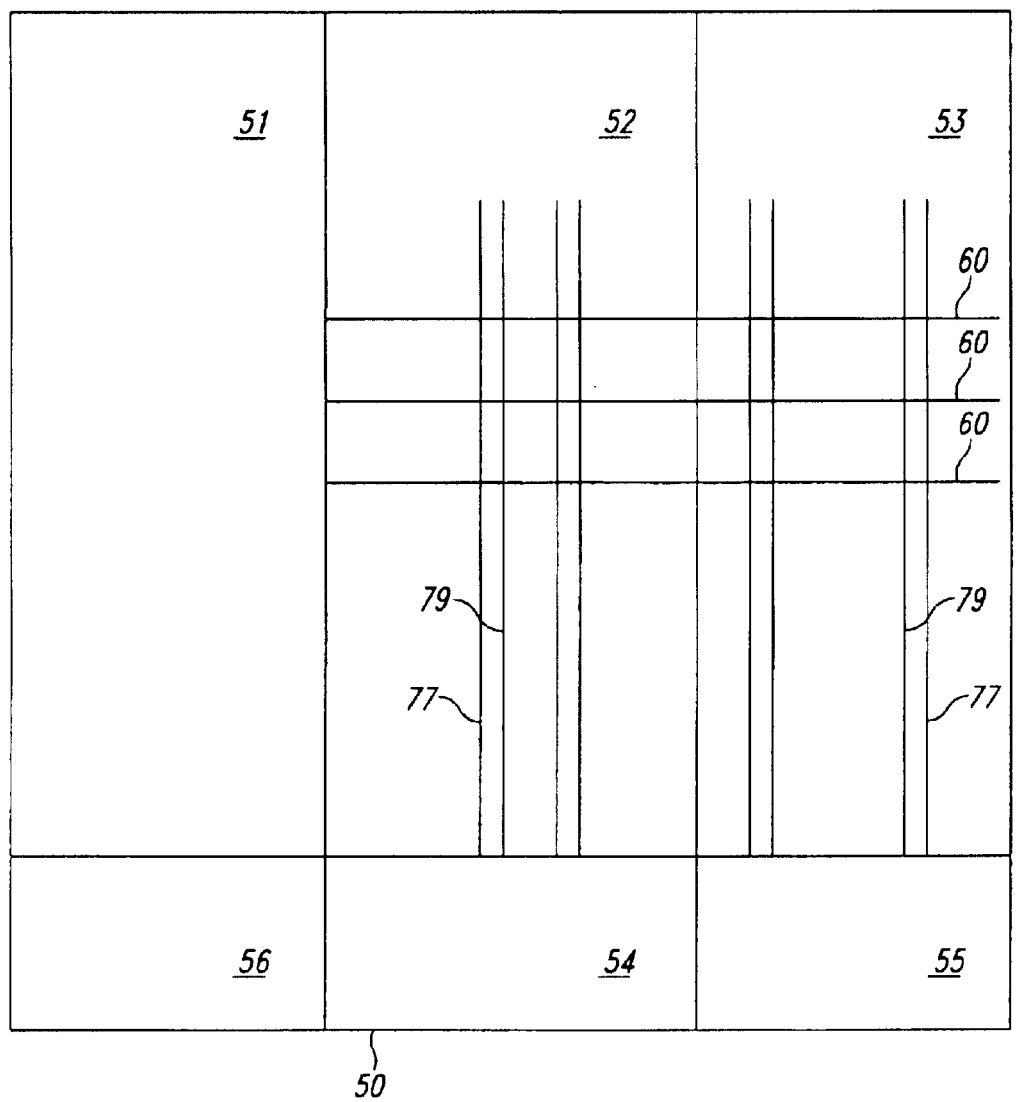
FIG. 3 shows a layout diagram for a cache memory in accordance with the present invention.

Referring now to FIG. 3 a block schematic diagram of a cache memory is shown. The memory 50 comprises 6 areas as follows:

The first area 51 is provided for the word line decoders and drivers.

The second and third areas 52, 53 which are alongside the first area 51 are a pair of memory arrays having word lines 60 extending through both of the arrays as row lines. Arranged on the row lines are multiple memory cells of the type shown in FIG. 2. The first array 52 forms a data RAM of the cache and has relatively thin cells. By thin cells it is meant that the transistors 71, 72, 74, 75 have a relatively low current drive capability. The second array 53 which lies beyond the first array 52 forms the tag RAM and has relatively fat memory cells. By fat cells it is meant that the transistors 71, 72, 74, 75 have a relatively high current drive capability. The fat cells provide a substantially higher drive capability to the bit lines of the tag RAM than is provided by the thin cells of the data RAM. The extra drive capability means that the bit lines in the tag RAM reach a valid potential level much more quickly than those of the data RAM.

The fourth area 54, which is associated with the bit lines 77, 79 of the tag RAM, is an area for sense amplifiers for the tag RAM, which sense amplifiers are formed of thin fast transistors. The fourth area 54 also provides the location for the comparator.

The fifth area 55 is the location for the sense amplifiers for the bit lines 77, 79 of the data RAM. The fifth area 55 also provides the location for the gating circuit and output driver circuitry of the cache memory.

The sixth and final area 56 is provided for control logic of the cache memory.

It will be seen that the floor plan of the cache memory 50 is very simple, and allows for a common word line.

The particular floor plan shown in FIG. 3 is exemplary; it would be possible for example to dispose the word line decoder and driver area 51 between the RAM areas 52 and 53.

Figure 4:
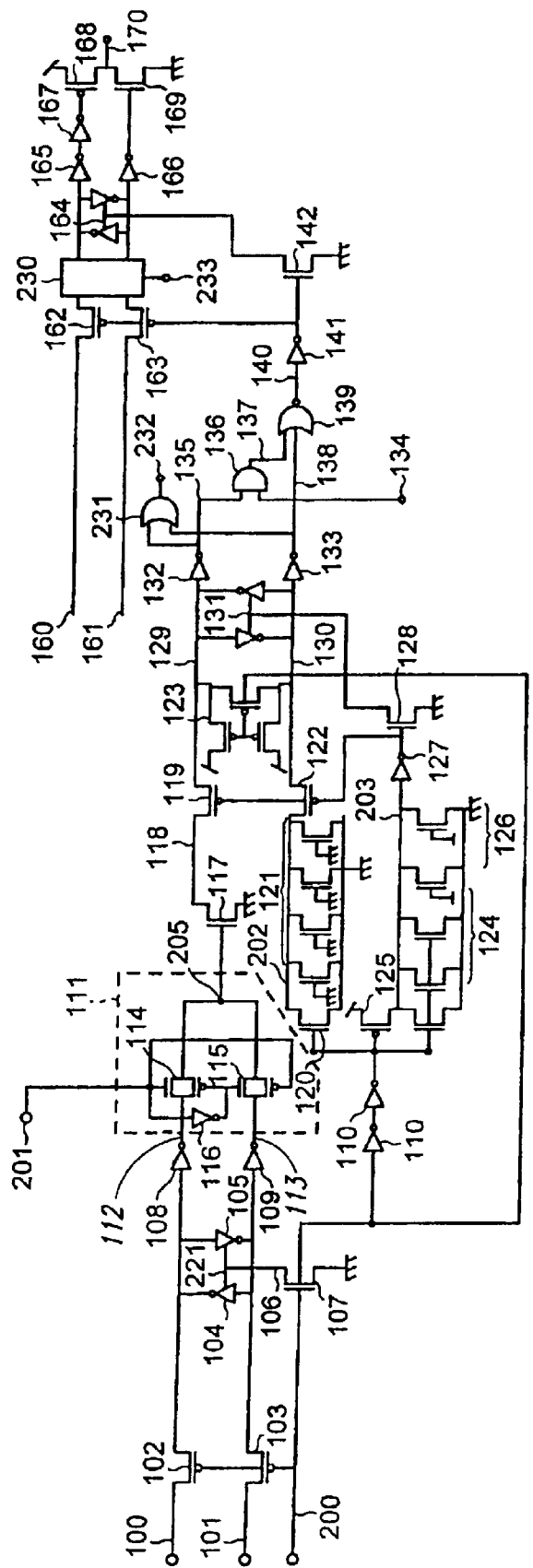
FIG. 4 shows a circuit diagram of a part of a cache memory device in accordance with the present invention.

FIG. 4 shows part of an embodiment of a cache memory in accordance with the invention. It will be clear to those skilled in the art that the full circuit has plural tag bit line pairs, one common comparator and plural data bit line pairs. For simplicity only one tag bit line pair and one data bit line pair is shown. The circuitry comprises tag sense amplifier circuitry, multiplexer circuitry, comparator and timing circuitry and data sense amplifier circuitry.

Each tag RAM complementary bit line pair 100, 101 is connected to a respective latching sense amplifier 221. The sense amplifier 221 comprises cross-coupled inverters 104, 105 having a common control terminal 106 connected to a first enable transistor 107, the connection of the bit lines to the sense amplifier being via a first pair of P channel hook transistors 102, 103. The gates of the hook transistors 102, 103 and the gate of the first enable transistor 107 are connected in common to a sense amp enable input 200 described more fully later herein. The differential output of the sense amplifier passes via respective buffer inverters 108, 109 to the multiplexer 111 controlled by a compare address bit signal 201. The multiplexer 111 comprises two pass gates 114, 115, each comprising a P transistor and an N transistor with a compare input 201 being connected to the gate of the N transistor of first pass gate 114 and to the gate of the P transistor of second pass gate 115 and further comprises an inverter 116 having an input connected to the compare input 201 and an output connected to the P channel transistor of the first pass gate 114 and to the gate of the N channel transistor of the second pass gate 115. The outputs of the two pass gates are connected together to the gate of a first pull-down N channel transistor 117, whose source is connected to the ground reference potential and whose drain is connected to a first comparator line 118. It will be understood by those skilled in the art that there will be one first pull-down N channel transistor 117 for each bit line pair, the number of bit line pairs corresponding to the number of bits in the tag. For the present example, assume 5 bits for the tag: hence there will be 5 bit line pairs and 5 transistors 117, each connected to the line 118.

The sense amp enable terminal 200 is furthermore connected via a delay circuit 110 to the control gate of a second N type comparator transistor 120, the control gates of three identical N type timing transistors 124 and the control gate of a P type timing transistor 125. The second comparator transistor 120 is half the width or twice the length of the first pull-down N-channel comparator transistor 117 and has a drain connected to a second comparator line 202 and a source connected to each. The second comparator line 202 is also loaded with respect to earth via four parallel N type transistors 121. Each of the transistors 121 has a gate which is connected to earth and each transistor 121 is identical to the previously discussed first pull-down transistor 117. The P timing transistor 125 has a source connected to a positive supply rail and a drain connected to a timing line 203. The timing line 203 is connected to the commoned drains of the three identical N transistors 124. The sources of the N transistors 124 are connected to earth. The timing line 203 is also loaded to earth by two identical N transistors 126 whose gates are connected to earth. The three N transistors 124 and the two N transistors 126 are identical in size to N-channel comparator transistor 112. The reason for the selection of the total number of transistors 120 and 121, and the total of transistors 124 and 126 as equal to the number of pull-down transistor 117 will now be explained. It will be recalled that there are five bit line pairs and hence five identical transistors 117. If all five of the transistors 117 are off (this corresponds to a hit), it is advantageous for the second comparator line 202 to have the same impedance to earth as the line 118, and to achieve this, five transistors are required. Likewise for line 203, to achieve the correct timing conditions.

The first and second comparator lines 118 and 202 are connected via econd P type hook transistors 119, 112 to a comparator sense amplifier 131 comprising ross-coupled inverters, the sense amplifier side of the second hook transistors 119 and 122 being connected to a precharge and equilibration circuit 123. Continuing to refer to FIG. 3 it will be seen that the precharge and equilibration circuit 123 comprises three P type transistors, having commoned control gates connected to the sense amplifier enable terminal 200. Two of the transistors connect a respective comparator line to the positive supply terminal and the third transistor connects the two comparator lines together when the sense amplifier enable terminal is at a low potential.

The second hook transistors 119, 122 have commoned control gates connected to the drain of an N type enable transistor 128. The control gate of N type enable transistor 128 is fed from the output of an inverter 127 and its source is connected to earth. The input to the inverter 127 is provided by the previously discussed timing line 203. The commoned gates of the second hook transistors 119, 122 also forms the enable terminal of the comparator sense amplifier 131.

The differential output of the comparator sense amplifier 131 appears on a first comparator output node 129 corresponding to first comparator line 118, and on a second comparator output node 130 corresponding to second comparator line 202. The output is fed to the inputs of respective inverters 132, 133. The inverter 132 which is connected to the first comparator output node 129 has an output 135 and the second inverter 133 whose input is connected to the second comparator output node 132 has an output 138. The output 135 of the first inverter 132 is connected to one input of a two-input AND gate 126, the other input of which is provided at an input terminal 134. The output terminal 137 of the AND gate 136 forms one input of a two-input NOR gate 139, the other input of which is the output terminal 138 of the second inverter 133. The output terminal of the NOR gate 139 is connected to the input of a further inverter 141.

A differential pair of data RAM bit lines 160, 161 is connected via third P channel hook transistors 162, 163 to a cross-coupled inverter type data RAM sense amplifier 164. The commoned gates of the third hook transistors 162, 163 are connected to the output of the further inverter 141. The output of the inverter 141 forms the control gate terminal of an N channel data sense amp enable transistor 142 having a source connected to the ground reference terminal and a drain connected to the enable terminal of the data RAM sense amplifier 164. It will be understood that there are plural data RAM bit line pairs, in number equal to the number of data bits. Thus, for example, there may be 32 data RAM bit line pairs, accessed by 32 parallel enable transistors 142. The differential output of the data RAM sense amplifier 164 is connected via a first and a second output inverter 165, 166 to a data sense amplifier output circuit. The data sense amplifier output circuit consists of a P channel pull-up transistor 168 having a control gate connected via a further output inverter 167 to the output of the first output inverter 165 and an N channel output transistor 169 connected to the output of the second output inverter 166. The drains of the P channel output transistor 168 and the N channel output transistor 169 are connected together at a common output terminal 170. The source of the P channel output transistor 168 is connected to the positive supply terminal and the source of the N channel output transistor 169 is connected to the ground reference terminal.

A read enable signal causes a precharge potential to be disconnected from the bit lines, and a memory cell to become connected to the differential bit lines 100, 101. This causes the bit line potentials to separate, and the separation to propagate along the bit lines.

The sense amplifier enable terminal 200 may receive the output of a dummy bit line or other suitable timing circuitry triggered by the read enable signal, to ensure that the first pair of hook transistors 102, 103 remain conductive until a suitable time has elapsed for propagation along the tag RAM bit lines to occur. Once that time has elapsed, the voltage on the sense amplifier enable input 200 makes a transition from low to high. This transition causes the first pair of hook transistors 102, 103 to become substantially open circuit ("off-hook"). Shortly afterwards the sense amplifier 221 latches by virtue of activation as the sense amplifier enable transistor 107 conducts. At substantially the same time, the precharge and equilibration circuit 123 of the comparator turns off.

Assume for example that the first bit line 100 is connected to a transistor storing logic 1 and the second bit line 101 is connected to a transistor storing logic 0. Then the sense amplifier 104, 105 latches with the input of first inverter 108 at logic 1 and the input of the second inverter at logic 0. Thus the output 112 of the first inverter 108 will be at logic 0 and the output 113 of the second inverter 109 will be at logic 1. If the compare address bit input 201 is at logic 1 the first pass gate 114 will connect to the multiplexer output 205 the logic 0 at the output of the first inverter 108. If instead the compare address bit input 201 is at logic 0, then the multiplexer 111 will provide at its output the logic 1 appearing at the output of the second inverter 109.

Thus for a hit defined as equality between the state stored on the bit line pair and the state of the compare address input, the multiplexer output 205 will have a logic 0. If all of the tag RAM bit line pairs have a hit with their compare inputs, all outputs 205 will be at logic 0, and all transistors 117 will be non-conducting.

The delay circuitry 110 is dimensioned to delay the sense amp enable transition to cause the comparator transistor 120 to turn on at substantially the same time as any logic 1 appears at the gate of the first pull-down transistor 117.

This later transition which causes the half-size comparator transistor 120 to switch on, pulls the second comparator line 202 to earth. At the same time the P timing transistor 125 which was pulling the third line 203 up to the positive supply terminal is turned off and the three N timing transistors 124 are turned on to rapidly pull the third line 203 to earth. This in turn causes the enable transistor 128 to switch on, by virtue of the inverter 127 and the turning on of the enable transistor 128 causes the second hook transistors 119, 122 to turn on and, at the same time the sense amplifier 131 to become enabled.

Prior to this time, the sense amplifier lines 129, 130 are both at high potential due to the precharge and equilibration circuit. This has the effect that the outputs 135 and 138 of the inverters 132, 133 are both at logic 0 which means that the output of the NOR 139 will be at logic 0.

Where there has been no match between the compare address at input 201 and the output of the sense amplifier 104, 105, it will be recalled that the multiplexer 111 provides at its output a logic 1. This causes the first pull-down transistor 117 to turn on pulling the first comparator line 118 from the precharge level of the positive supply down towards earth. Note that the first pull-down transistor 117 conducts current at twice the rate of the half-size comparator transistor 120. Hence for a miss, the first comparator line 118 will always be more negative than the second comparator line 202. However, for a hit, all of the transistors 117 will be off, and the half-size transistor 120 is on. This ensures that the second comparator line 202 is always more negative than the first comparator line 118.

Hence for a miss, the sense amplifier 131 latches with the terminal 129 at logic 0 and the terminal 130 at logic 1 and vice-versa for a hit. The logic level on the second terminal 129 is inverted by inverter 132 on line 135 and compared in gate 136 with the input at the input terminal 134.

Where a hit occurs, line 130 is at logic 0 and line 129 at logic 1. The logic 0 at line 130 is inverted in inverter 133 to provide a logic 1 at line 138. It should be noted that prior to sensing by the comparator both lines 129 and 130 are at logic 1: as a result both lines 135 and 138 are at logic 0. Once sensing occurs lines 135 and 138 become complementary. For a hit, line 138 makes a transition to 1. Before sensing the NOR gate 139 has inputs of 0,0 (giving an output of 1) and after sensing, inputs of 0,1 (giving an output of 0). The output of the NOR gate 139 is inverted by the inverter 141 to control the data RAM sensing circuitry.

For a miss, the situation varies according to the input at terminal 134. If no action is desired, then 134 is set to 0. Prior to sensing, both inputs to AND gate 06 are at 0, giving a 0 output. The NOR 139 has 0 at both inputs giving a 1 output. After sensing, the AND 136 remains at 0 and the NOR output remains at 1.

If data read is needed even on miss, the terminal 134 is set to 1. Then when the line 135 goes to 1 after sensing, the NOR gate makes a transition to logic 0.

Whenever the NOR gate output goes to 0, the output of the inverter 141 goes to logic 1. The effect of this is as follows: Prior to the appearance of any logic 1 at the output of the further inverter 141, transistor 142 is turned off and the third hook transistors 162, 163 are disabled. Precharge circuitry 230, similar to circuitry 220 and 123, causes both of the terminals of the data RAM sense amplifier 164 to be at logic 1. This in turn causes the application of a negative potential to the N type output transistor 169 causing it to turn off and a positive potential to be applied to the gate of the P type output transistor 168 causing it to turn off. As a consequence, unless and until the data RAM sense amp 164 is enabled, so as to provide complementary outputs, the output terminal will be at a high impedance tristate condition.

When however a logic 1 is provided at the output of the inverter 141, this renders non-conductive the third hook transistors 162, 163 and turns on the transistor 142 thereby enabling the third sense amplifier 164.

As a result it will be seen that where terminal 134 is at logic 0, the output of the comparator circuitry is always at logic 0 except when a hit has occurred.

It will be clear to those skilled in the art that timing difficulties exist in determining whether or not a hit has occurred, and in outputting the data from the data RAM upon the occurrence of a hit. For example, upon addressing a tag entry and the corresponding data entry, the tag information is output from the tag RAM and must then be compared with input address information and a decision reached as to whether or not a hit or miss has occurred. Only when the result of that decision has been validly determined can data from the data RAM be output.

All of the above U.S. patents, U.S. patent application publications, U.S. patent applications, foreign patents, foreign patent applications and non-patent publications referred to in this specification and/or listed in the Application Data Sheet, including but not limited to [insert list], are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A cache memory having a tag RAM, tag RAM sense amplifier circuitry, a data RAM, data RAM sense amplifier circuitry and decision circuitry for selectively enabling said data RAM sense amplifier circuitry, said decision circuitry having a first input for stored tag data and a second input for address data, said decision circuitry having a first valid state when said tag data matches said address data and a second valid state different to said first valid state when said tag data differs from said address data, said decision circuitry having a control input for setting said decision circuitry to an invalid state different to said valid states, wherein said decision circuitry has first and second nodes, said nodes being at complementary logic levels in said valid output states and at a common potential in said invalid state.

2. A cache memory according to claim 1, wherein said tag RAM sense amplifier circuitry has an enable input for receiving an enable signal, said cache memory further comprising timing circuitry having an input connected to said enable input and a first output connected to said control input of said decision circuitry, whereby said decision circuit attains one of said first and second valid states a first predetermined interval after application of an enable signal to said enable input of said tag RAM sense amplifier circuitry.

3. A cache memory as claimed in claim 2, wherein said decision circuitry further comprises first current source circuitry for selectively applying a current to said first node when said address data differs from said stored tag data and second current source circuitry for applying a second current source to said second node and sensing circuitry having first and second sensing circuitry nodes, said sensing circuitry being responsive to a potential on said first and second nodes for establishing said first axed second sensing circuitry nodes.

4. A cache memory as claimed in claim 3, wherein said sensing circuitry comprise equalization circuitry responsive to said enable input of said tag RAM sense amplifier circuitry for selectively applying said common potential to said first and second sensing circuitry nodes.

5. A cache memory as claimed in claim 3, wherein said sensing circuitry comprises a latch circuitry connected between said first and second sensing circuitry nodes and selectively connectable to said first and second nodes via a gating circuitry, said latch circuit and said gating circuit being activated by said control input.

6. A cache memory as claimed in claim 5, wherein said second current source circuitry is connected to a second output of said timing circuitry, whereby said second current source is activated a second predetermined interval after said application of said enable signal.

7. A cache memory as claimed in claim 6, wherein said first current source circuitry comprises a first transistor.

8. A cache memory as claimed in claim 6, wherein said tag RAM comprises a plurality of bit line pairs, each pair having an associated tag RAM sense amplifier and an associated first current source, each first current source comprising a respective first transistor, said first transistors being identical and of one polarity, said first current sources being connected between one said first node and a reference node, and said second current source circuitry comprising a corresponding plurality of second transistors connected between said second node and said reference node, said second transistors being of said one polarity.

9. A cache memory as claimed in claim 8, wherein one of said second transistors has half the current-carrying capability of said first transistors, and has a control gate connected to said second output of said timing circuitry.

10. A cache memory as claimed in claim 9, wherein the remaining second transistors have control gates connected to said reference node.

11. A cache memory as claimed in claim 8, wherein said timing circuitry comprises a first delay circuit having said enable input of said tag RAM sense amplifier circuitry as its input and said second output as its output and a second delay circuit in series therewith, said second delay circuit comprising a plurality of third transistors connected in parallel between a timing node and said reference node, said third transistors being of said one polarity, and a fourth transistor of opposite polarity connected between said timing node and a supply rail, said timing node providing an output to said control input.

12. A cache memory as claimed in claim 11, wherein said decision circuitry further comprises logic circuitry connected to said data RAM sense amplifier at an enable terminal thereof, said logic circuitry being responsive to said first and second sensing circuitry nodes and providing a first predetermined output for enabling said data RAM sense amplifier circuitry only in response to one of said valid states at said nodes.

13. A cache memory as claimed in claim 12, wherein said logic circuitry has a control input whereby said logic circuitry responds to a predetermined logic state at said control input to provide said predetermined output for enabling said data RAM sense amplifier circuitry in response to the other valid state.

14. A cache memory as claimed in claim 11, wherein said data RAM sense amplifier circuitry has differential input terminals and precharge and equalization circuitry for precharge and equalization of said differential input terminals, said cache memory further comprising OR circuitry connected to said first and second sensing circuitry nodes, and to said precharge and equalization circuitry for terminating precharge and equalization when said first and second sensing circuitry nodes change from said invalid state to one of said valid states.

15. A cache memory as claimed in claim 14, wherein said data RAM sense amplifier circuitry has an output for data stored by said data RAM, said output being at a high impedance state when said precharge and equalization circuitry is active.

16. A cache memory as claimed in claim 1, wherein said tag RAM sense amplifier circuitry has first and second differential outputs, wherein said decision circuitry further comprises multiplexer circuitry having an output, said multiplexer circuitry having an input for said address data whereby said multiplexer circuitry passes the state at said first differential output when said address data is logic 1 and the state at said second differential output when said address data is logic 0.

17. A cache memory as claimed in claim 16, wherein said first current source circuitry responds to the output of said multiplexer circuitry.

18. A method of operating a cache memory having a stored tag data, an input for address data, a data RAM, data RAM sense amplifier circuitry and decision circuitry for selectively enabling said data RAM sense amplifier circuitry, said decision circuitry having a first and a second node, the method comprising:
  sensing stored tag data;
  comparing said stored tag data with input address data; and
  setting said first and second nodes to a common potential, wherein said comparing step comprises:
    providing a first logic level on the first node and a second opposite logic level on the second node in response to a match between said stored tag data and said input address data; and
    providing said second logic level on the first node and said second opposite logic level on the first node when said stored tag data differs from said address data.

19. A method of operating a cache memory according to claim 18, wherein said step of sensing comprises providing an enable signal to said tag RAM sense amplifier circuitry and maintaining said common potential on said first and second nodes for a first predetermined interval after application of said enable signal.

20. A method of operating a cache memory as claimed in claim 19, wherein said decision circuitry further has a sense node and a reference node, and said comparing step comprises:
  applying a reference current to said reference node, applying a current to said sense node when said input address data differs from said stared tag data after a second interval, applying the potentials on said reference and sense nodes to a latch circuit.

21. A method of operating a cache memory as claimed in claim 20, wherein said cache memory comprises a tag RAM and a tag RAM sense amplifier, having first and second differential outputs, wherein said comparing step further comprises selecting one of said differential outputs when said address data has a first logic value, and the other of said differential outputs when said address data has a second logic value opposite to said first logic value, and using the selected output to control application of said current to said sense node.

22. A cache memory having a tag RAM, tag RAM sense amplifier circuitry, a data RAM, data RAM sense amplifier circuitry and decision circuitry for providing a read enable signal to a read enable terminal of said data RAM sense amplifier circuitry, said decision circuitry having a first input for stored tag data, a second input for address data and a pair of intermediate nodes, a first of said intermediate nodes being at logic 1 and the second being at logic 0 when said tag data matches said address data, the second of said intermediate nodes being at logic 1 and the first being at logic 0 when said tag data differs from said address data, said decision circuitry having a control input for setting said nodes to a common potential, wherein said decision circuitry further comprises logic circuitry being responsive to said first and second intermediate nodes and operable to provide a read enable signal to said read enable terminal only in response to said match, wherein said logic circuitry has a control input and said logic circuitry responds to a predetermined logic state at said control input to provide said read enable signal to said read enable terminal whenever said intermediate nodes have complementary levels.

23. A cache memory according to claim 22, wherein said tag RAM sense amplifier circuitry has an enable input for receiving a sense amplifier enable signal, said cache memory further comprising timing circuitry having an input connected to said enable input and a first output connected to said control input of said decision circuitry, whereby said nodes of said decision circuit are maintained at said common potential for a first predetermined interval after application of an enable signal to said sense amplifier enable input.

24. A cache memory as claimed in claim 23, wherein said decision circuitry further comprises a sense node and a reference node, first current source circuitry for applying a current to said sense node when said address data differs from said stored tag data, second current source circuitry for applying a reference current source to said reference node and sensing circuitry having said first and second intermediate nodes, said sensing circuitry being responsive to a potential on said sense and reference nodes for establishing said logic states thereon.

25. A method of operating a cache memory having a tag RAM, tag RAM sense amplifier circuitry, a data RAM, data RAM sense amplifier circuitry laving a read enable input, the method comprising:
  sensing stored tag data;
  comparing said sensed tag data with input address data;
  establishing a first circuit condition and maintaining said first circuit condition until a valid comparison is achieved and upon achieving a valid comparison:
  establishing a second circuit condition when a match is detected between said sensed tag data and said input address data;
  establishing a third circuit condition when no match is detected, in response to said step of establishing said second condition:
  generating a read enable signal; and
  supplying said read enable signal to said read enable input, the method further comprising:
  determining an input at a control terminal to selectively provide said read enable signal to said read enable terminal responsive to said step of establishing said third condition.

26. The method of claim 25, wherein said cache memory comprises a comparator circuit having two circuit nodes, wherein in said circuit first condition said two nodes are at a common potential, in said second and third circuit conditions said nodes have complementary logic states, with one of said nodes being at logic value 1 in said second circuit condition and the other of said nodes being at logic 1 in said third circuit condition.

27. The method of claim 26, wherein said step of sensing stored tag data comprises supplying a sense signal to said tag RAM sense amplifier circuitry to initiate sensing, said step of establishing said first circuit condition comprises applying said common potential to said two circuit nodes, and said step of maintaining said first circuit condition until a valid comparison is achieved comprises providing a timing signal a predetermined time after said supplying of said sense signal to activate said comparator circuit.

28. The method of claim 27, wherein said comparator circuit comprises a latch circuit, and said step of activating said comparator circuit comprises enabling said latch circuit.

29. The method of claim 28, wherein said comparing step comprises applying a reference current to a first comparator terminal, in response to no said match applying a current to a second comparator terminal, and connecting said latch circuit to said first and second comparator terminals.

30. A cache memory having a tag RAM, tag RAM sense amplifier circuitry, a data RAM, data RAM sense amplifier circuitry and decision circuitry, the tag RAM sense amplifier circuitry having an enable input for receiving a sense amplifier enable signal, the decision circuitry having a first input for stored tag data, a second input for address data and a control input for enabling said decision circuitry, the data RAM sense amplifier circuitry having a disable input terminal and a read input terminal, said decision circuitry providing a data read signal to said read input terminal of said data RAM sense amplifier circuitry when a match exists between said stored tag data and said address data, the memory further comprising:
  timing circuitry responsive to said sense amplifier enable signal for maintaining a first level at said control input thereby holding an output of said decision circuitry in an inactive condition for a given period, and thereafter applying a second level at said control input, thereby allowing said output to become active; and
  logic circuitry sensing an active output of said decision circuitry for supplying a disabling signal to said disable input terminal, thereby disabling said data RAM sense amplifier circuitry until after said output of said decision circuitry becomes active.

31. A cache memory as claimed in claim 30, wherein said data RAM sense amplifier circuitry has an output for data stored by said data RAM, said output being at a high impedance state when said data RAM sense amplifier circuitry is disabled.

32. A cache memory as claimed in claim 31, wherein said data RAM sense amplifier circuitry has differential input terminals and precharge and equalization circuitry for precharge and equalization of said differential input terminals, said disable input terminal being operative upon termination of said disabling signal to terminate said precharge and equalization.

33. A cache memory as claimed in claim 30, wherein said decision circuitry has two circuit nodes, said decision circuitry having a first condition in which said two circuit nodes have a common potential, said first condition corresponding to an inactive output and a second condition in which said two nodes are at complementary logic levels, corresponding to said active output.

34. A cache memory as claimed in claim 33, wherein in said second condition a match is indicated when a predetermined one of said nodes is at logic 1 and a miss is indicated when said one of said nodes is at logic 0.

35. A cache memory as claimed in claim 34, wherein said decision circuitry further comprises second logic circuitry connected to said data read terminal, said logic circuitry being responsive to said circuit nodes and providing a data read signal to said read input terminal of said data RAM sense amplifier circuitry when said one of said nodes is at logic 1.

36. A cache memory as claimed in claim 35, wherein said second logic circuitry is responsive to a predetermined logic level at a control input thereof to provide said data read signal when said two nodes have complementary logic levels regardless of whether said one of said nodes or the other of said nodes is at logic 1.

37. A cache memory as claimed in claim 30, wherein said decision circuitry has a first node and a reference node, first current source circuitry for selectively applying a current to said first node when said address data differs from said stored tag data and reference current source circuitry for applying a reference current source to said reference node and latching circuitry having first and second latching circuitry nodes, said latching circuitry being responsive to a potential on said first and reference nodes for establishing said complementary logic levels on said first and second latching circuitry nodes.

38. A cache memory as claimed in claim 37, further comprising equalization circuitry responsive to said enable input of said tag RAM sense amplifier circuitry for selectively applying said common potential to said first and second latching circuitry nodes.

39. A cache memory as claimed in claim 37, wherein said latching circuitry is selectively connectable to said first and reference nodes via a gating circuit, said latching circuitry and said gating circuit being activated by an output of said timing circuitry.

40. A cache memory as claimed in claim 39, wherein said reference current source circuitry is connected to a second output of said timing circuit, whereby if said reference current source is activated a predetermined interval after said application of said sense amplifier enable signal.

41. A cache memory as claimed in claim 40, wherein said tag RAM comprises a plurality of bit line pairs, each pair having an associated tag RAM sense amplifier and an associated first current source, each first current source comprising a respective first transistor, said First transistors being identical and of one polarity, said first current sources being connected between one said first node and a reference node, and said reference current source circuitry comprising a said plurality of reference transistors connected between said second node and said reference node, said reference transistors being of said one polarity.

42. A cache memory as claimed in claim 41, wherein each of said first transistors has a predetermined current-carrying capability, one of said reference transistors has half said predetermined current-carrying capability of said first transistors, and has a control gate connected to said second output of said timing circuitry.

43. A cache memory as claimed in claim 42, wherein the remaining second transistors have control gates connected to said reference node.

44. A method of operating a cache memory having a tag RAM, tag RAM sense amplifier circuitry, a data RAM, data RAM sense amplifier circuitry and decision circuitry, the tag RAM sense amplifier circuitry having an enable input for receiving a sense amplifier enable signal, the decision circuitry having a first input for stored tag data, a second input for address data and a control input for enabling said decision circuitry, the data RAM sense amplifier circuitry having a disable input terminal and a read input terminal, the method comprising:

providing a disabling signal to said disable input terminal, thereby disabling said data RAM sense amplifier circuitry;

maintaining a first level at said control input thereby holding an output of said decision circuitry in an inactive condition for a given period after said sense amplifier enable signal;

thereafter applying a second level at said control input, thereby allowing said output to become active;

sensing the output of said decision circuitry;

in response to an active output, terminating supply of said disabling signal to said disable input terminal; and providing a data read signal to said read input terminal of said data RAM sense amplifier circuitry when a match exists between said stored tag data and said address data.

45. A method of operating a cache memory as claimed in claim 44, further comprising maintaining an output of said data RAM sense amplifier circuitry in a high impedance state while said data RAM sense amplifier circuitry is disabled.

46. A method as claimed in claim 45, wherein the decision circuitry further comprises precharge and equalization circuitry, the method comprising, in response to said sense amplifier enable signal, precharging and equalization of differential input terminals of said decision circuitry; and before said step of terminating said disabling signal, ceasing precharge and equalization of said differential input terminals.

47. A method as claimed in claim 44, wherein said decision circuitry has two circuit nodes, said decision circuitry having a first condition in which said two circuit nodes have a common potential, said first condition corresponding to an inactive output and a second condition in which said two nodes are at complementary logic levels, corresponding to said active output.

48. A method as claimed in claim 44, wherein said decision circuitry has a first node and a reference node, the method comprising:

applying a current to said first node when said address data differs from said stored tag data;

applying a reference current source to said reference node;

wherein said step of applying said second level at said control input comprises connecting latching circuitry having first and second latching circuitry nodes to said first and reference nodes, whereby said latching circuitry establishes said complementary logic levels on said first and second latching circuitry nodes.

49. A method as claimed in claim 48, further comprising in response to said sense amplifier enable signal, selectively applying a common potential to said first and second latching circuitry nodes.

50. A method as claimed in claim 48, further comprising activating said reference current source a predetermined interval after said application of said sense amplifier enable signal.

* * * * *

UNITED STATES PATENT AND TRADEMARK OFFICE
CERTIFICATE OF CORRECTION

PATENT NO. : 6,721,193 B2
DATED : April 13, 2004
INVENTOR(S) : William Bryan Barnes It is certified that error appears in the above-identified patent and that said Letters Patent is hereby corrected as shown below:

<u>Column 17,</u>
Line 22, "whereby *if* said reference" should read as -- whereby said reference --.

Signed and Sealed this

Seventeenth Day of August, 2004

JON W. DUDAS
*Acting Director of the United States Patent and Trademark Office*